United States Patent [19]

Fair

[11] Patent Number: 5,406,186
[45] Date of Patent: Apr. 11, 1995

[54] ONE SWITCH MULTI-PHASE MODULATOR

[75] Inventor: Donald G. Fair, Belvidere, Ill.

[73] Assignee: Sundstrand Corporation, Rockford, Ill.

[21] Appl. No.: 186,203

[22] Filed: Jan. 25, 1994

[51] Int. Cl.$^6$ .............................................. H02P 5/28
[52] U.S. Cl. .................................... 318/798; 318/771; 310/159
[58] Field of Search ................ 318/771, 819, 820, 778, 318/780, 798; 310/165, 166, 159, 179, 162

[56] References Cited

U.S. PATENT DOCUMENTS

| | | | |
|---|---|---|---|
| 2,966,623 | 12/1960 | Mishkin | 310/159 |
| 3,045,166 | 7/1962 | Robinson | 318/771 |
| 3,702,965 | 11/1972 | Drexler et al. | 310/165 |
| 3,940,668 | 2/1976 | Apsit et al. | 318/771 |
| 4,446,915 | 5/1984 | Taylor et al. | 318/771 |
| 4,608,527 | 8/1986 | Glennon et al. | 318/685 |
| 4,866,591 | 9/1989 | Cook et al. | 363/67 |
| 4,935,686 | 6/1990 | Stacey | 318/771 |

OTHER PUBLICATIONS

An article entitled "Design and Implementation of Three-Phase SPWM AC-to-DC Converters With Unity Power Factor and Near Optimum Dynamic Regulation" written by Wen-Inne Tsai and York-Yih Sun, National Cheng Kung University, Taina, Taiwan R.O.C. Jul. 4, 1992.

Primary Examiner—Shoop, Jr. William M.
Assistant Examiner—John W. Cabeca
Attorney, Agent, or Firm—Jeffery J. Makeever

[57] ABSTRACT

An electrical apparatus, comprises a bridge circuit having a plurality of rectifier legs electrically coupled in parallel. Each of the rectifier legs comprises a first and a second rectifier coupled in series and having an input node therebetween. The electrical apparatus further comprises a switch, having a control input, a power input, and a power output, coupled in parallel with the bridge circuit, and a controller having a control output coupled to the control input of the switch for regulating the opening and closing of the switch. When the bridge/switch element is coupled to the disassociated neutral terminals of a wye wound electrical device, the controller modulates the opening and closing of the switch to provide an current controlled soft start of the device, as well as continued motor drive capability, including acceleration and breaking of the device. When the element is coupled to the disassociated neutral of a multi-phase generator or transformer, the controller modulates the opening and closing of the switch to provide output power regulation. This regulation allows controlled battery utilization and charging in one embodiment.

21 Claims, 9 Drawing Sheets

ONE SWITCH MULTI-PHASE MODULATOR

FIELD OF THE INVENTION

The instant invention relates generally to electrical motor drives and regulators, and more particularly to a one-switch, multi-phase neutral modulator for controlling the operation of motors, generators, transformers, and battery chargers.

BACKGROUND ART

The increasing complexity of the electronics used in high technology industries, such as aerospace, has enabled control of most parameters to the finest possible resolution. Although this complexity of control is desirable for flight control computers and ground avoidance systems, as examples, for many applications this complexity, and the increased costs associated therewith, is not required. For these components, a low cost, simple solution is desirable which dispenses with the complex algorithms and custom integrated circuits, but which provides the benefits of weight, reliability, precision, and ease of use available through electronic control.

In order to better define the inventive contribution detailed hereinafter, there is now offered a review of the state of the art, beyond which the invention described in this specification will be distinguished.

Brushless DC motor control is one area into which a large effort has been directed. The advancements in closed loop control is evident in the patent to Glennon, et al., U.S. Pat. No. 4,608,527 which provides optimized efficiency of the motor by varying the phase advance of the drive with the change in load demand. The system described in Glennon, et al. utilizes a real current error signal to control the phase shift of the waveform provided to the motor windings which effectively corrects the real current error due to load and improves the motor efficiency. This shifted waveform is generated by a phase advance waveform generator which, through a multi-phase controlled power supply circuit, drives each winding of the motor.

Although this system provides much needed advancements in the art for many applications, the cost and complexity of such control may make it unattractive to many other applications which currently utilize hydraulic control and human interface, such as raising and lowering loading ramps, etc. A great majority of low cost approaches to these applications utilize a simple induction motor energized via a three-pole switch or three-pole contactor operated by a person or simple logic. The results achieved by these systems are approximate, i.e. jogging a mechanism to an approximate location or to a limit switch. These simple systems, however, suffer from inrush current problems and mechanism oscillations when subjected to fast accelerations.

The invention to be described hereinafter approaches the motor drive control in a uniquely different manner in that a single switch coupling and de-coupling the neutral of the windings is utilized to energize and control the motor. Unlike the prior art systems which strive to control the input waveform to the motor windings, the present invention, through the use of a rectifier bridge and a single switch, allows direct connection to the source voltage. Control is then providing by disassociating the neutral of the windings, coupling them to the bridge, and allowing the switch to control the current flow through the windings by opening and shorting the neutrals. In this way, by selecting the proper relationship AC currents, the motor is energized to drive the load. Additionally, by pulse width modulating (PWM) the switch at start up, the current is controlled and a soft start of the motor is thus achieved, eliminating the problems associated with the simple prior art systems. Further, proper phase selection and "inchworming" of the PWM switch control allows a phase advance of the resulting stator flux to drive the motor at various speeds.

In addition to providing a simple motor drive for low cost, low complexity applications, the present invention, through its single switch neutral coupling modulation, also provides output voltage regulation for both permanent magnet generator based supplies and transformer rectifiers.

Typically, prior art systems for controlling output voltage have concentrated on the output of the device. As illustrated in a patent to Cook, et al., U.S. Pat. No. 4,866,591, for a Regulated Transformer Rectifier Unit, a second secondary winding is utilized through a switch to maintain a constant voltage to a varying load. Although this system provides superior output control over earlier systems, it may be to complex and costly for many applications. Additionally, the current carrying and interruption capacity of the switch is required to be much greater on the secondary side of the unit for aircraft applications.

The instant invention is directed to overcoming one or more of the above problems.

SUMMARY OF THE INVENTION

It is the primary objective of the instant invention to provide a new and improved electrical apparatus for the modulated control and operation of electrical devices. More specifically, it is the objective to provide a one-switch modulator for multi-phase generators (to control and regulate the output power), motors (to control the start, acceleration, and deceleration), and transformer rectifiers (to control and regulate the output power).

The one-switch modulator comprises a bridge circuit having a plurality of rectifier legs electrically coupled in parallel. Each of the rectifier legs comprises a first and a second rectifier coupled in series and having an input node therebetween. The one-switch modulator further comprises a switch, having a control input, a power input, and a power output, coupled in parallel with the bridge circuit, and a controller having a control output coupled to the control input of the switch for regulating the opening and closing of the switch.

In one embodiment of the instant invention, the one-switch modulator is coupled to the disassociated neutral terminals of a wye wound electrical machine. The controller then modulates the opening and closing of the switch to provide a current controlled soft start of the machine. In addition to providing this soft start, continued motor drive capability, including acceleration and breaking of the machine is facilitated by the controller.

In another embodiment of the instant invention, the one-switch modulator is coupled to the disassociated neutral of a multi-phase generator or transformer. For this embodiment, the controller modulates the opening and closing of the switch to provide output power regulation. When the generator or transformer is used to generate direct current power, this regulation additionally allows controlled battery utilization and charging.

BRIEF DESCRIPTION OF THE DRAWING

While the specification concludes with claims particularly pointing out and distinctly claiming that which is regarded as the instant invention, the organization, the advantages, and further objects of the invention may be readily ascertained by one skilled in the art from the following detailed description when read in conjunction with the accompanying drawings in which:

DESCRIPTION OF THE PREFERRED EMBODIMENTS

Figure 1:
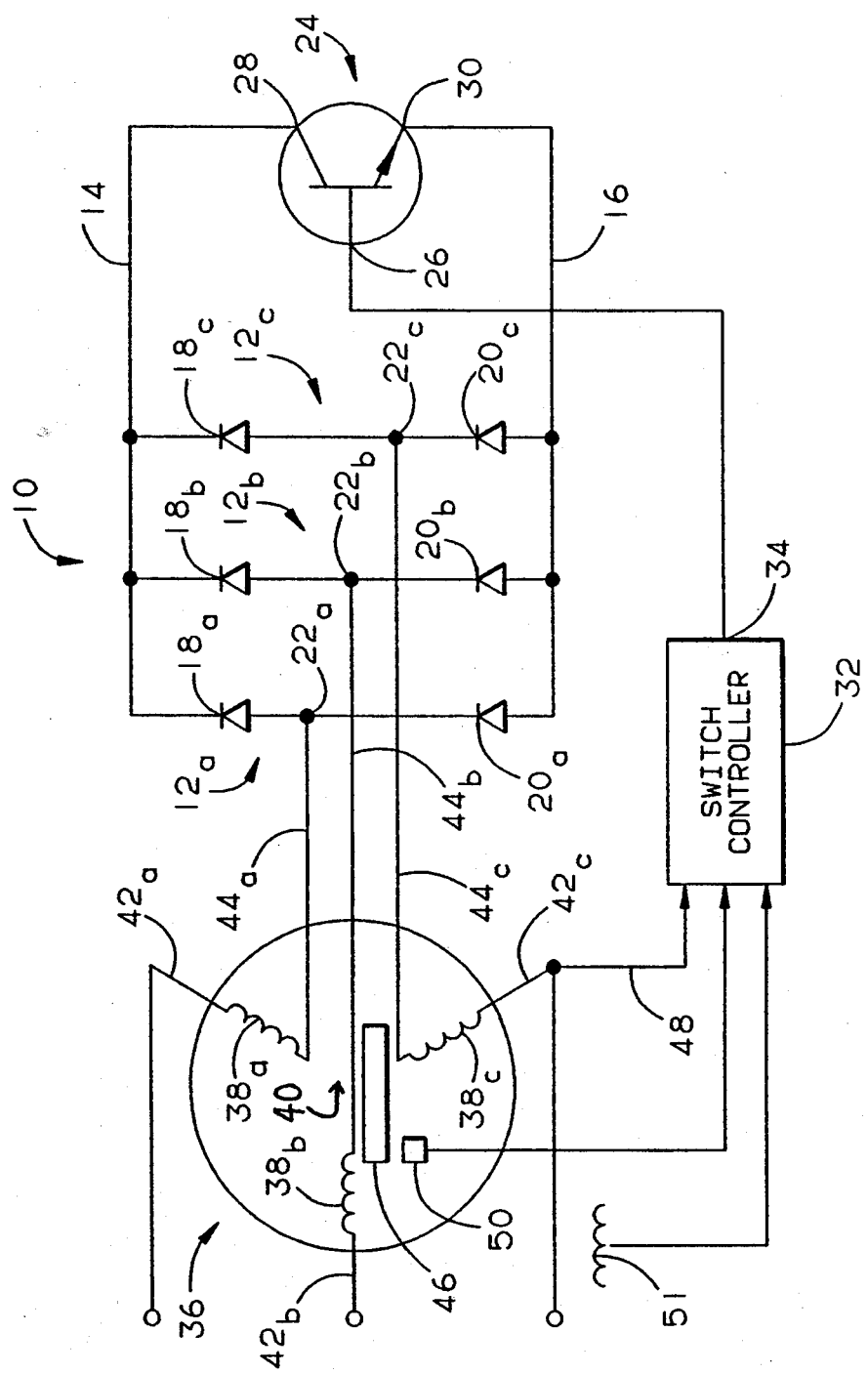
FIG. 1 is a single line electrical schematic diagram of an embodiment of an electrical apparatus constructed in accordance with the instant invention.

Attention is now directed to FIG. 1 which illustrates a single line electrical schematic of an electrical apparatus constructed in accordance with the instant invention. Although the apparatus illustrated comprises three phases, it will become apparent through the following description to one skilled in the art that the instant invention is equally well suited to applications having more or fewer phases than the embodiments illustrated, and the applicant wishes to reserve the exclusive use of all modifications which come within the scope of the appended claims.

Specifically, the electrical apparatus of FIG. 1 comprises a bridge circuit 10 having a plurality of rectifier legs 12 electrically coupled in parallel. As illustrated, three rectifier legs 12a, 12b, 12c are coupled in parallel and form a top node 14 and a bottom node 16 thereby. Each of the rectifier legs 12a, 12b, 12c, comprises a first rectifier, such as diodes 18a, 18b, 18c, and a second rectifier, such as diodes 20a, 20b, 20c, coupled in series. An input node 22a, 22b, 22c, is formed by this series connection between each of the diodes 18a and 20a, 18b and 20b, 18c and 20c respectively. A switch, such as transistor 24, having a control input 26, and a power input 28 switchably coupled to a power output 30, is coupled in parallel with the bridge circuit 10 by coupling the transistor power input 28 to the top node 14 of the bridge circuit 10, and by coupling the transistor power output 30 to the bottom node 16 of the bridge circuit 10. The embodiment illustrated in FIG. 1 further comprises a controller 32 having a control output 34 which is coupled to the control input 26 of transistor 24. This controller 32 regulates the opening and closing of the transistor 24 which electrically de-couples and couples the top node 14 from/to the bottom node 16. Additionally, the electrical apparatus comprises an electrical device, such as the electrical motor 36, which has a plurality of windings, such as stator windings 38a, 38b, 38c configured in a quasi-wye configuration having a disassociated neutral 40. Each of the windings 38a, 38b, 38c has a line terminal 42a, 42b, 42c. The neutral terminal 44a, 44b, 44c. The neutral terminal 44a, 44b, 44c of each of the windings 38a, 38b, 38c is coupled to one of the input nodes 22a, 22b, 22c of the rectifier legs 12a, 12b, 12c.

To enable operation of the electrical motor 36, the line terminals 42a, 42b, 42c are coupled to an external multi-phase source of electrical energy (not shown). The controller 32 then generates a close command on its control output 34 to drive the transistor 24 into conduction. During this period of operation, the transistor 24 shorts the top node 14 of the bridge circuit 10 to the bottom node 16, and electrically associates the neutral terminals 44a, 44b, 44c of the windings 38a, 38b, 38c thereby. This electrical association allows current to flow from the multi-phase source of electrical energy, through the windings 38a, 38b, 38c and the bridge circuit 10, and back to the external source to complete the electrical circuit, which establishes a rotating flux wave which rotates the rotor 46. When it is desired to disable operation of the electrical motor 36, the controller 32 generates a trip command, or simply removes the close command depending on the control characteristics of the switching device, on the control output 34 to open the transistor 24 which electrically disassociates the neutral terminals 44a, 44b, 44c of the windings 38a, 38b, 38c. This disassociation opens the electric circuit and disables current flow through the windings 38a, 38b, 38c, which removes the traveling flux wave and allows the rotor 46 to stop.

The inrush current drawn by an electrical motor 36 upon start is considerably higher than that which is required during normal operation. This inrush current is often great enough to have an adverse affect the power quality of the bus to which it is connected, and additional complexity must be built into the source controller (not shown) to deal with it. The controller 32 of the applicant's invention solves this inrush current problem by generating a pulse-width modulated close command on the control output 34 to modulate the state of the transistor 24 into and out of conduction, and thereby, the electrical association and disassociation of the neutral terminals 44a, 44b, 44c of the windings 38a, 38b, 38c. This control technique limits the inrush current and provides a soft start of the electrical motor 36, removing the need to add complexity to the source controller (not shown) to handle motor starts.

In a further embodiment of the instant invention, the controller 32, in addition to controlling the actual start and stop of the electric motor 36 as described above, provides regulated current control by adding current sensing means 51, and controlled acceleration and deceleration by adding rotor velocity sensing means 50, in the conventional manner using control logic within the controller 32. Variable speed capability at one of many fractional frequencies is obtained by adding voltage waveform sensing means 48 when coupled to at least one of the line terminals 42a, 42b, 42c of the windings 38a, 38b, 38c and monitors the applied voltage from the external source of electrical energy (not shown). The waveform sensing means 48 then communicates the applied voltage waveform information to the controller 32 for processing. The controller monitors this applied voltage waveform information to determine the proper switch closure periods based on the phase angle of the applied waveform. When the rotor velocity sensing is added, the controller 32 can also monitor the rotational velocity information both as a closed loop feed back signal for rotor speed and as an input to a differentiator (not shown) to calculate rotor acceleration. The controller 32 then calculates a switch closure period, and generates a pulse-width modulated close command in response thereto to control the rotational acceleration of the rotor 46. Once the proper rotor speed is achieved, the controller 32 maintains the PWM pattern until a further acceleration, or deceleration is requested. By controlling the rotor acceleration, the controller 32 also controls the current flow into the motor 36, and thus limits the effect on the power generating system.

Figure 2:
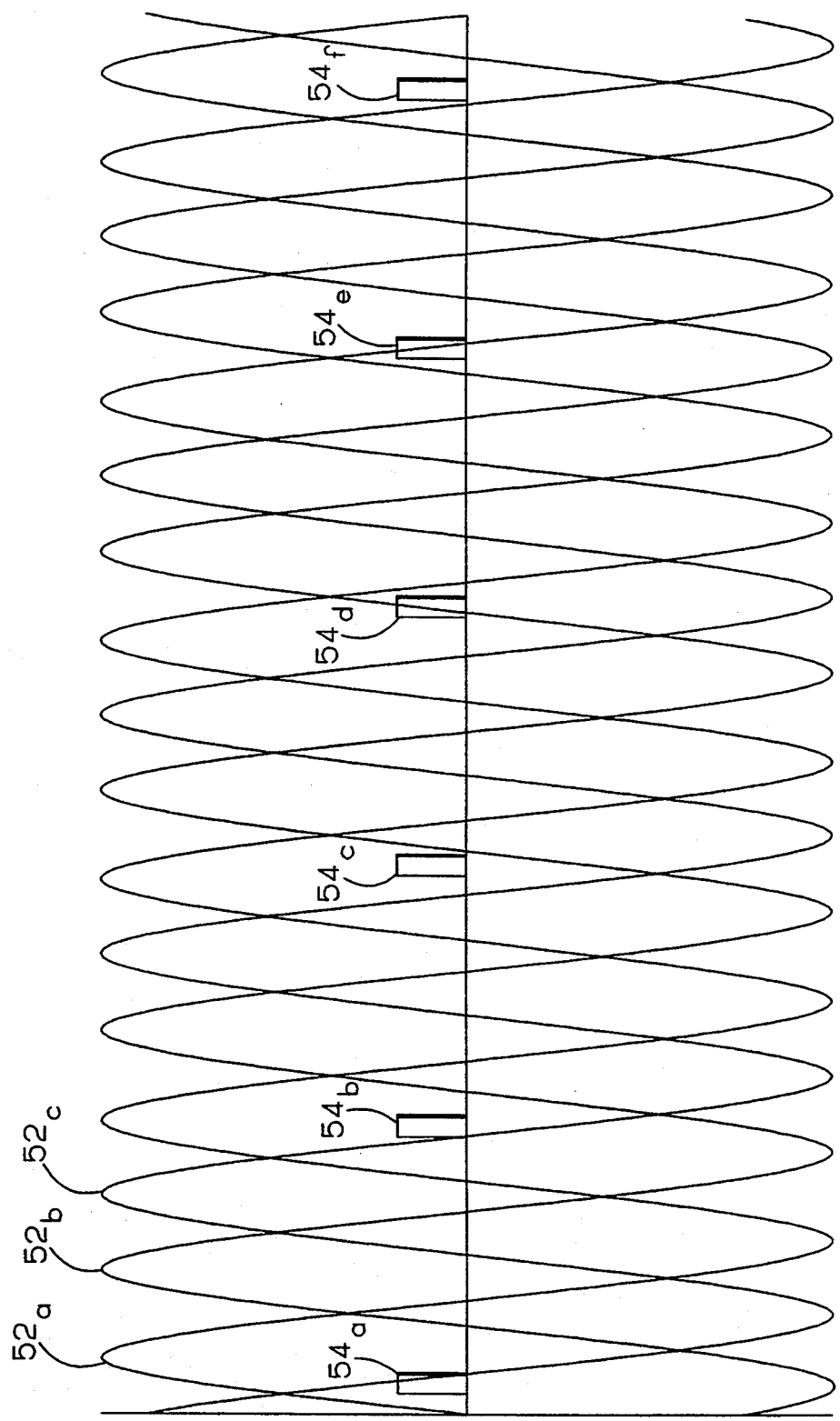
FIG. 2 is a waveform diagram illustrating switch closure periods superimposed on a three phase input sine wave.
Figure 3:
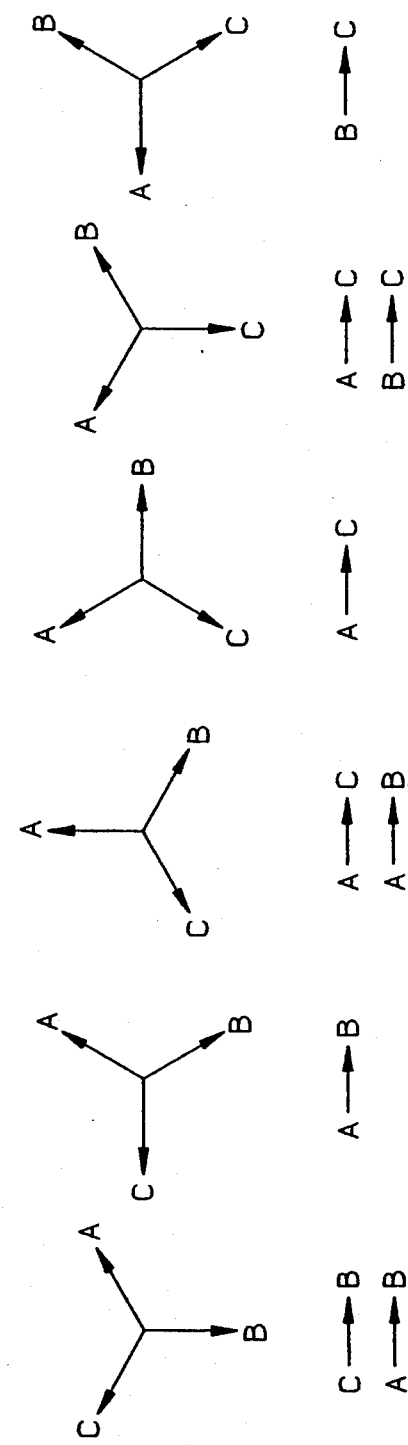
FIG. 3 is a current vector waveform diagram illustrating current flow at the switch closure periods of FIG. 2.

FIG. 2 illustrates three phases of applied voltage 52a, 52b, 52c and a calculated switch closure pattern 54 which advances the flux vector through 180° of the motor frame. The current vectors associated with the closure pattern of FIG. 2 are illustrated in FIG. 3. The first vector diagram illustrated in FIG. 3a indicates the current vectors existing at the first closure period 54a of FIG. 2. The vector diagram of the second closure period shown in FIG. 3b, initiated 390° of the applied voltage waveform later as indicated by switch closure period 54b, illustrates that the vectors have only advanced 30° from that of FIG. 3a. Likewise, the vectors of FIG. 3c have only advanced 30° from those of FIG. 3b, although 390° of the applied voltage waveform has passed for the switch closure period 54c. This pattern continues for FIG. 3d, FIG. 3e, and FIG. 3f which correspond to switch closure periods 54d, 54e, and 54f respectively. By allowing the switch 24 (see FIG. 1) to conduct for a short period of time, equivalent to approximately 30° of the applied voltage frequency, and by advancing the closure period a fixed angular amount each cycle, for example 30°, a rotor speed of 1/12 that of the applied voltage frequency is achieved. By varying the phase timing of the switch closure patterns, rotor speeds of 1/6, 1/12, 1/18 . . . are achieved.

Figure 4:
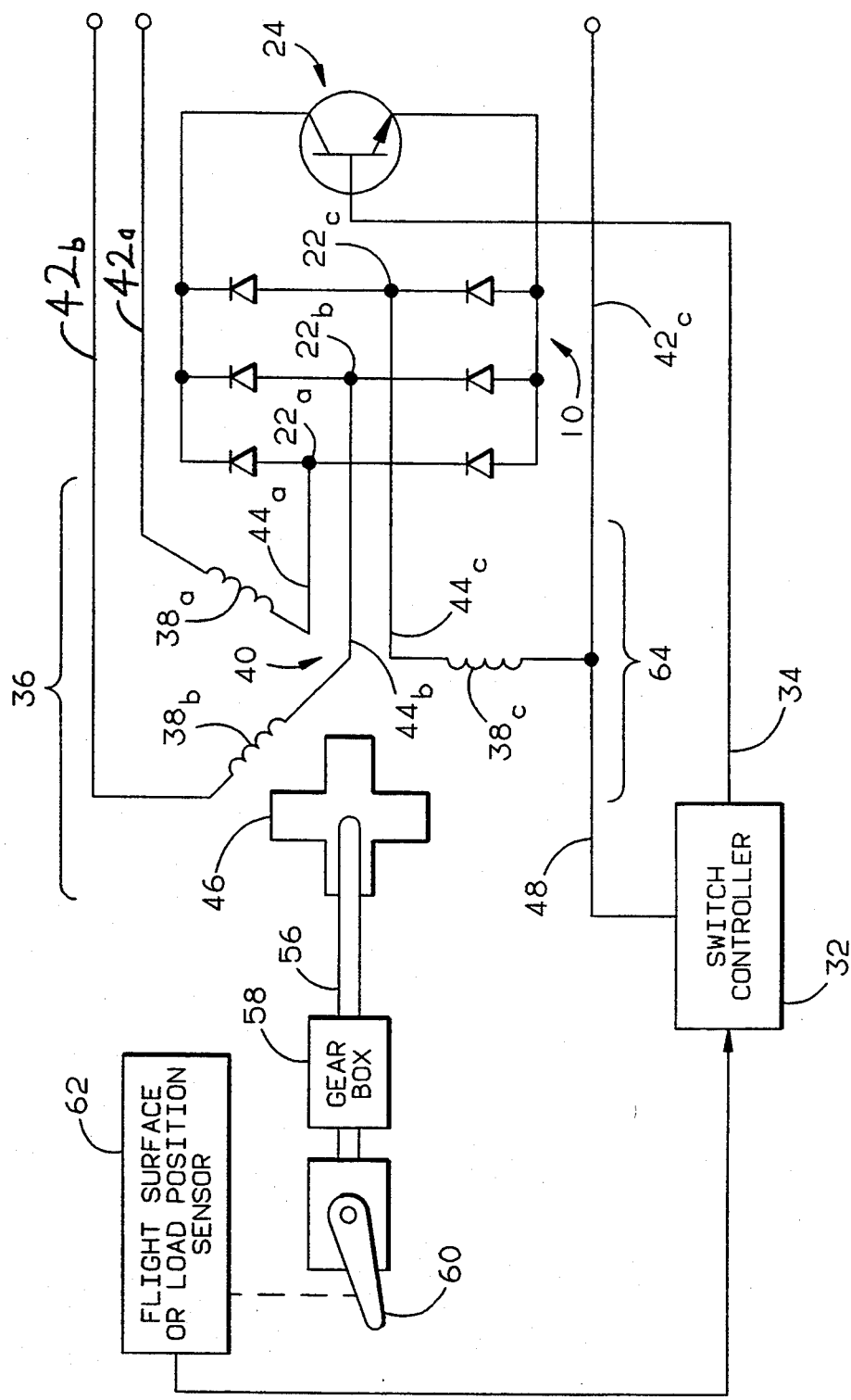
FIG. 4 is a single line electrical schematic diagram of an alternate embodiment of an electrical apparatus constructed in accordance with the instant invention.

FIG. 4 illustrates a further embodiment of the instant invention comprising a multi-phase motor 36 having stator windings 38a, 38b, 38c configured in a quasi-wye configuration having a disassociated neutral 40. Each of the windings 38a, 38b, 38c has a line terminal 42a, 42b, 42c and a neutral terminal 44a, 44b, 44c. The neutral terminal 44a, 44b, 44c of each of the windings 38a, 38b, 38c is coupled to one of the input nodes 22a, 22b, 22c of the bridge circuit 10 which is alternately opened and shorted by switch 24. The line terminals 42a, 42b, 42c are coupled to an external source of electrical energy (not shown). The rotor 46 is driveably coupled to a shaft 56, and through a gear box 58, actuates an external mechanism, such as flight surface 60. A position sensing means, such as the flight surface or load position sensor 62, monitors the position of the flight surface 60, and communicates surface position information to the controller 32. As described above, the voltage waveform sensing means 48 is coupled to at least one of the line terminals 42a, 42b, 42c of the windings 38a, 38b, 38c and monitors the applied voltage from the external source of electrical energy. The waveform sensing means 48 then communicates the applied voltage waveform information to the controller 32 for processing. The controller monitors this applied voltage waveform information and the surface position information, calculates a switch closure period of each source voltage cycle, and generates a pulse-width modulated close command in response thereto to position a flux vector in the stator 64 of the motor 36 as discussed above.

In this embodiment, the controller 32 varies the switch closure period of each source voltage cycle to establish a clockwise advance of the flux vector about the stator 64, which results in a clockwise rotation of the rotor 46. This rotation is transmitted via the shaft 56 to the gear box 58 to actuate the surface 60 in one direction. Further when it is desired to actuate the surface 60 in the opposite direction, the controller 32 varies the switch closure period of each source voltage cycle to establish a counter-clockwise advance of the flux vector about the stator 64, which results in a counter-clockwise rotation of the rotor 46. This rotation is also transmitted via the shaft 56 to the gear box 58 to actuate the surface. As the surface nears the end of its travel, the controller 32 skips successive switch closure periods of each source voltage cycle to slow the rate of re-positioning of the flux vector, which results in a slower rate of rotation of the rotor 46 as discussed above. This deceleration continues until the stop point is reached.

At this point it is important to note that the design of the gear box 58 not critical to the instant invention. Certainly, depending on surface size, loading, and motor sizing, the surface 60 could be directly driven by the motor 36, and the scope of the instant invention should not be limited to applications which contain gear boxes. Also, the word surface has been used to discuss a load which is positioned, although the application of the instant invention is not limited to moving surfaces. Antenna, booms, lift gates, doors, or any other mechanism which requires controlled speed actuation by an electric motor are applicable surfaces for purposes of the instant invention.

Figure 5:
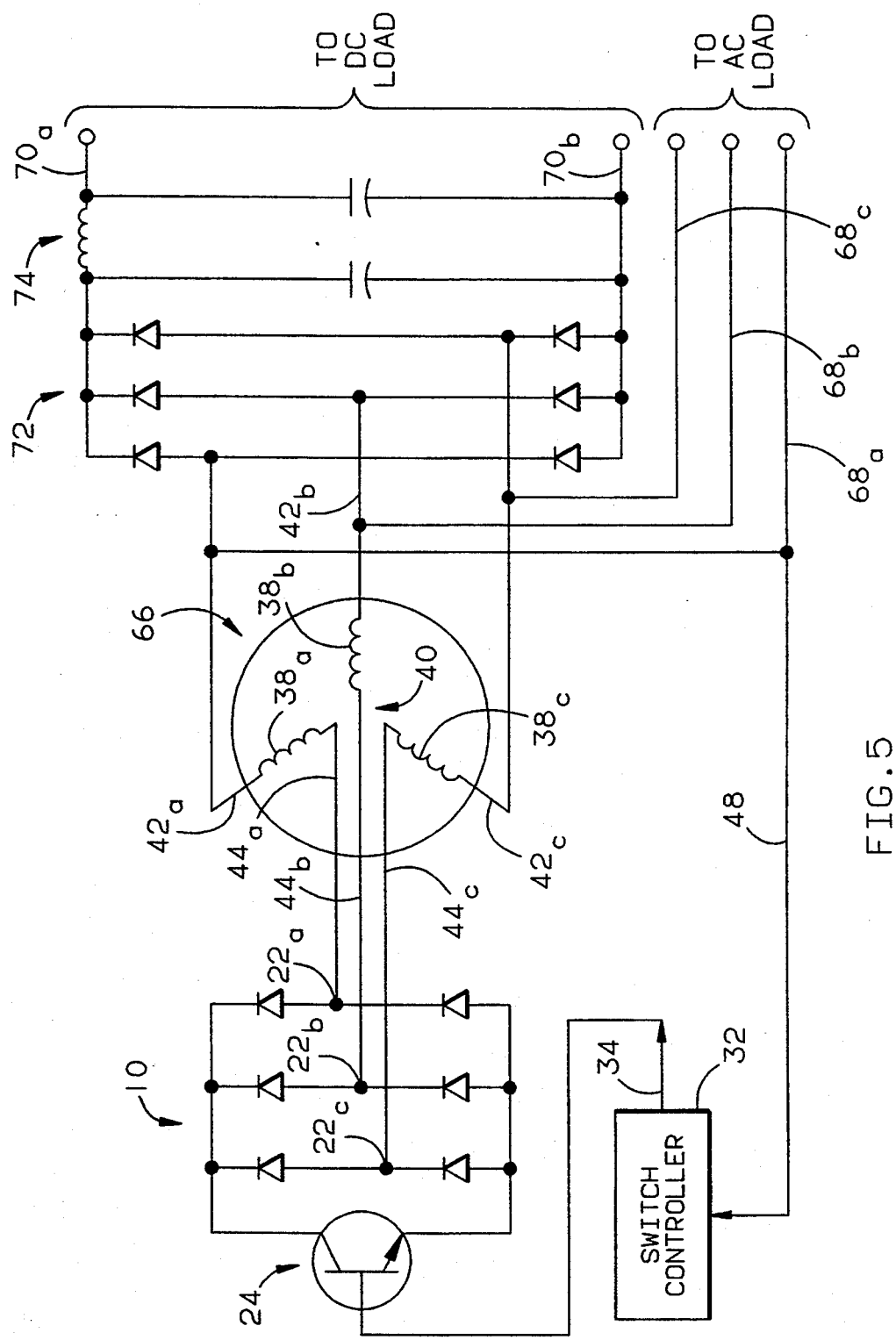
FIG. 5 is a single line electrical schematic diagram of an alternate embodiment of an electrical apparatus constructed in accordance with the instant invention.

A further embodiment is illustrated in FIG. 5, in which a multi-phase electrical generator 66 having stator windings 38a, 38b, 38c is configured in a quasi-wye configuration having a disassociated neutral 40. Each of the windings 38a, 38b, 38c has a line terminal 42a, 42b, 42c and a neutral terminal 44a, 44b, 44c. The neutral terminal 44a, 44b, 44c of each of the windings 38a, 38b, 38c is coupled to one of the input nodes 22a, 22b, 22c of the bridge circuit 10 which is alternately opened and shorted by switch 24. The line terminals 42a, 42b, 42c are coupled to external loads which utilize the generated energy. As shown in FIG. 5, both AC and DC loads may be coupled to the generator 66. AC power is transmitted to the AC loads by feeders 68a, 68b, 68c which are coupled to the line terminals 42a, 42b, 42c respectively. The DC load are supplied by feeders 70a, 70b once the AC power from the generator 66 has been rectified and filtered by suitable means, such as by rectifier 72 and filter 74.

The regulation of the power generated by the generator 66, which may be driven by a variable or fixed speed drive (not shown), is accomplished by the controller 32. Voltage waveform sensing means 48 are coupled to at least one of the windings 38a, 38b, 38c, preferably at the line terminal 42a, 42b, 42c. This sensing means 48 monitors the AC voltage generated by the electrical generator 66, and communicates this generated voltage waveform information to the controller 32. The controller 32 monitors this generated voltage waveform information, calculates a switch closure period, and generates a pulse-width modulated close command on output 34 in response thereto to regulate this voltage by commanding the switch 24 to alternately associate and disassociate the neutral of the stator windings 38a, 38b, 38c. Preferably, the generator 66 is a permanent magnet generator having a rotor comprised of a plurality of samarium cobalt magnets (not shown).

Figure 6:
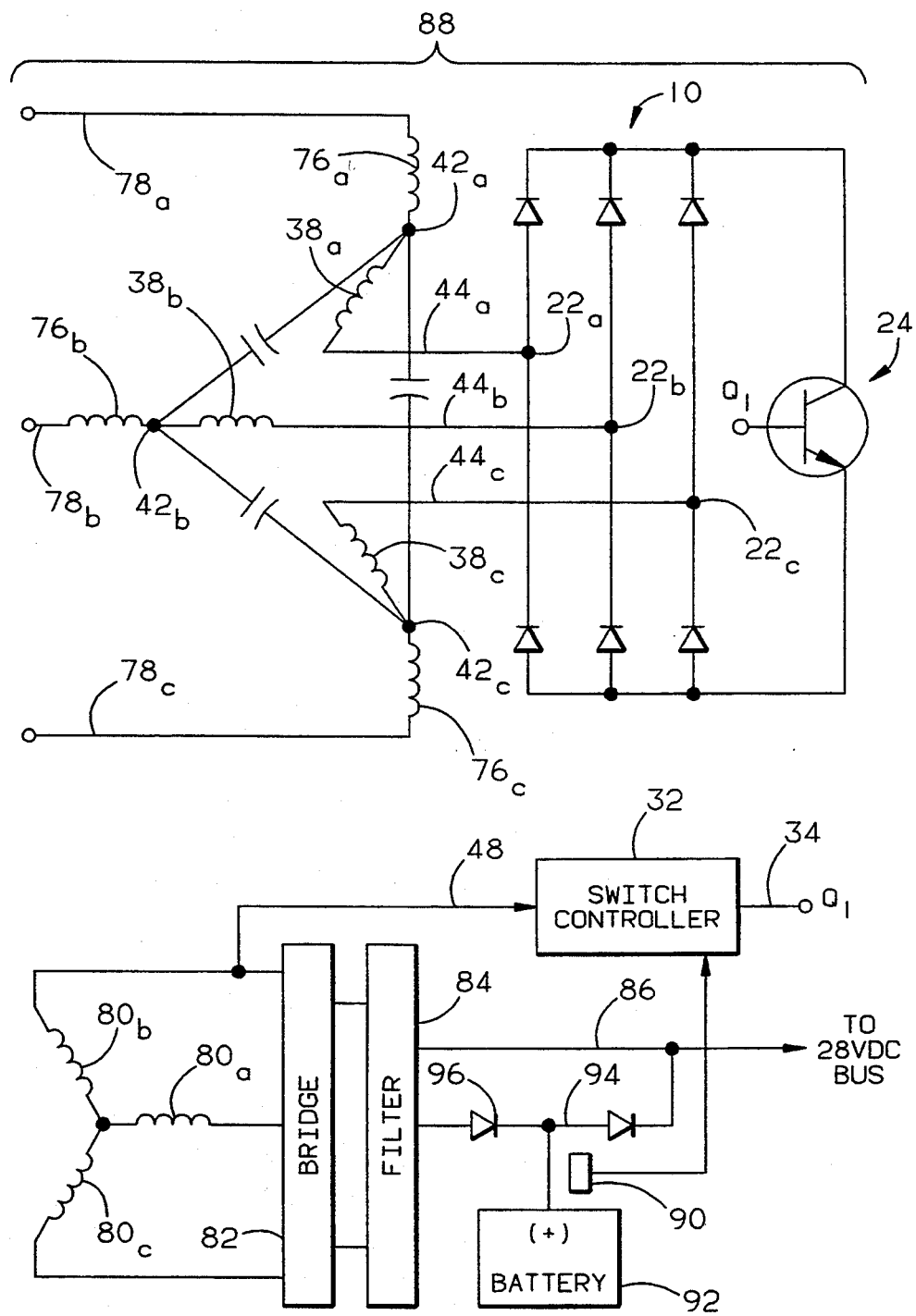
FIG. 6 is a single line electrical schematic diagram of an alternate embodiment of an electrical apparatus constructed in accordance with the instant invention.

In a further embodiment of the instant invention, as illustrated in FIG. 6, a multi-phase transformer comprises primary windings 38a, 38b, 38c which are configured in a quasi-wye configuration having a disassociated neutral 40. Each of the windings 38a, 38b, 38c has a line terminal 42a, 42b, 42c and a neutral terminal 44a, 44b, 44c. The neutral terminal 44a, 44b, 44c of each of the windings 38a, 38b, 38c is coupled to one of the input nodes 22a, 22b, 22c of the bridge circuit 10 which is alternately opened and shorted by switch 24. The line terminals 42a, 42b, 42c are coupled through line inductors 76a, 76b, 76c to an external source of electrical energy (not shown) via feeders 78a, 78b, 78c. The transformer also comprises at least one secondary winding, such as secondary windings 80a, 80b, 80c shown in FIG. 6. The transformed AC voltage on the secondary windings 80a, 80b, 80c is coupled through a bridge 82 and a filter 84, which is configured to remove ripple from the rectified voltage, to external DC loads (not shown) via feeder 86. Voltage sensing means 48 is coupled to at least one of the outputs of the secondary windings 80a, 80b, 80c. This sensing means 48 monitors the voltage present on the secondary windings 80a, 80b, 80c, and communicates this voltage information to the controller 32. The controller 32 monitors this voltage information, calculates a switch closure period, and generates a pulse-width modulated close command on output 34 in response thereto to regulate the secondary voltage by commanding the switch 24 to alternately associate and disassociate the neutral of the primary windings 38a, 38b, 38c.

Figure 7:
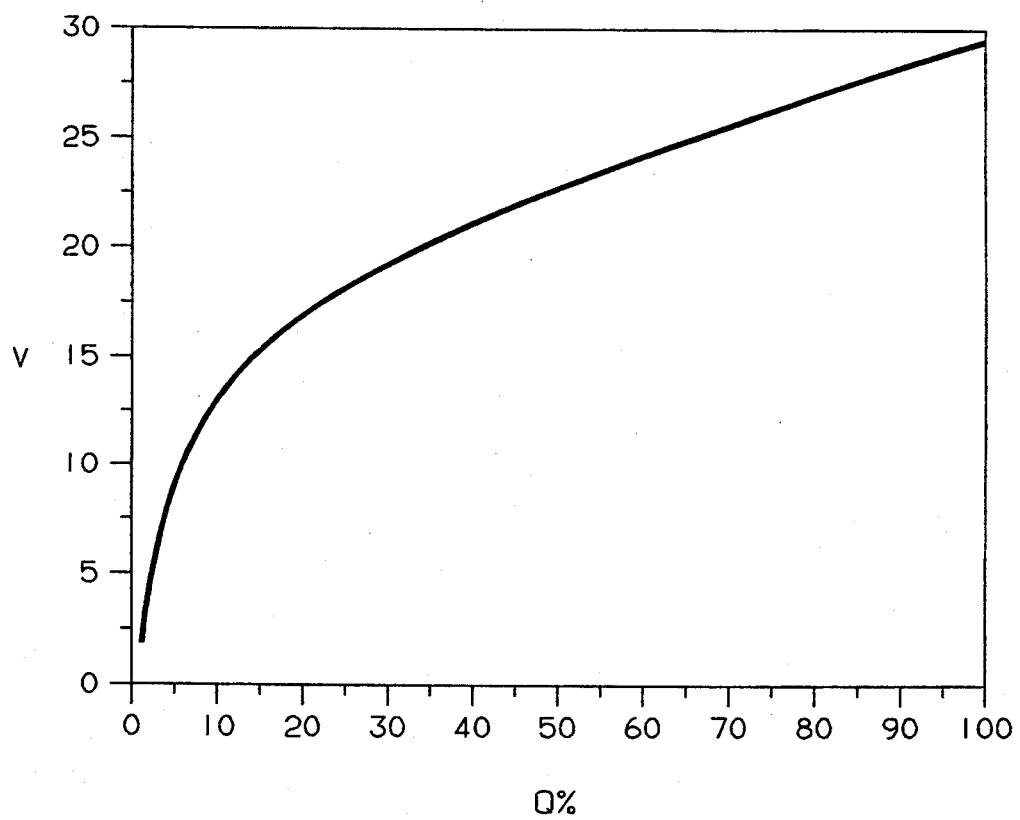
FIG. 7 is a graph illustrating the relationship between battery terminal voltage and charge.

Further, as illustrated in FIG. 6, the regulated transformer rectifier 88 comprises a DC current sensor 90 which monitors current flow into and out of a battery 92 which is coupled to the output of the filter 84 by line 94 through blocking diode 96. This DC current sensor 90 communicates DC current information to the controller 32 which incorporates strategy logic to enable controlled charge and discharge of the battery 92. FIG. 7 illustrates the relationship between charge and battery terminal voltage for a typical battery such as may be used on aircraft 28 volt DC systems. The controller 32 incorporates the information from this graph into its strategy logic, monitors the voltage information from the voltage sensing means 48 and the battery current information from the DC current sensor 90, calculates a switch closure period, and generates a pulse-width modulated close command in response thereto to gradually change the desired magnitude of the voltage present on the secondary windings 80a, 80b, 80c to enable controlled charge and discharge of the battery 92.

Figure 8:
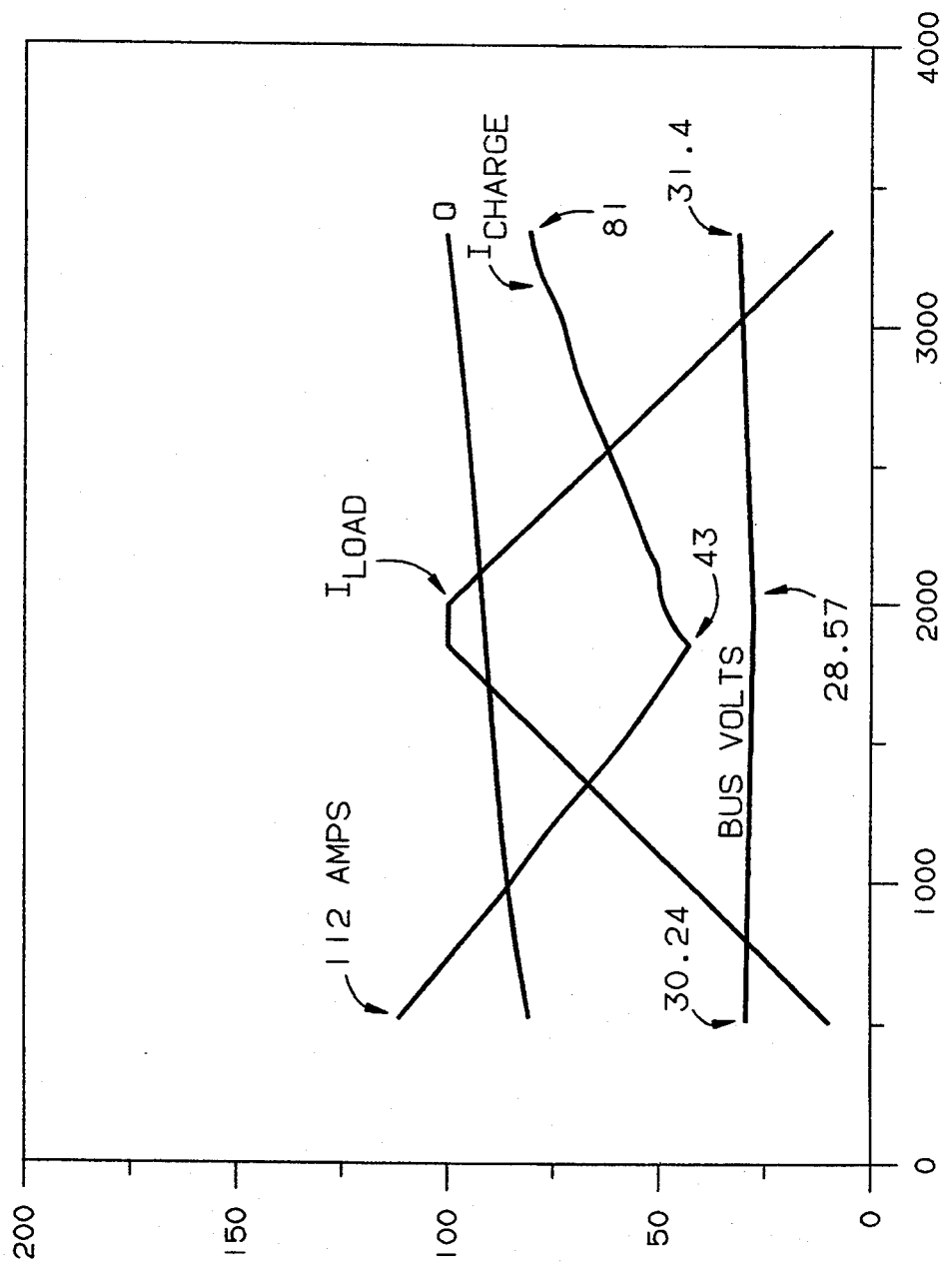
FIG. 8 is a graph illustrating the relationship between DC bus voltage, applied DC bus load, battery charging current, battery charge, and transformer rectifier output current.
Figure 9:
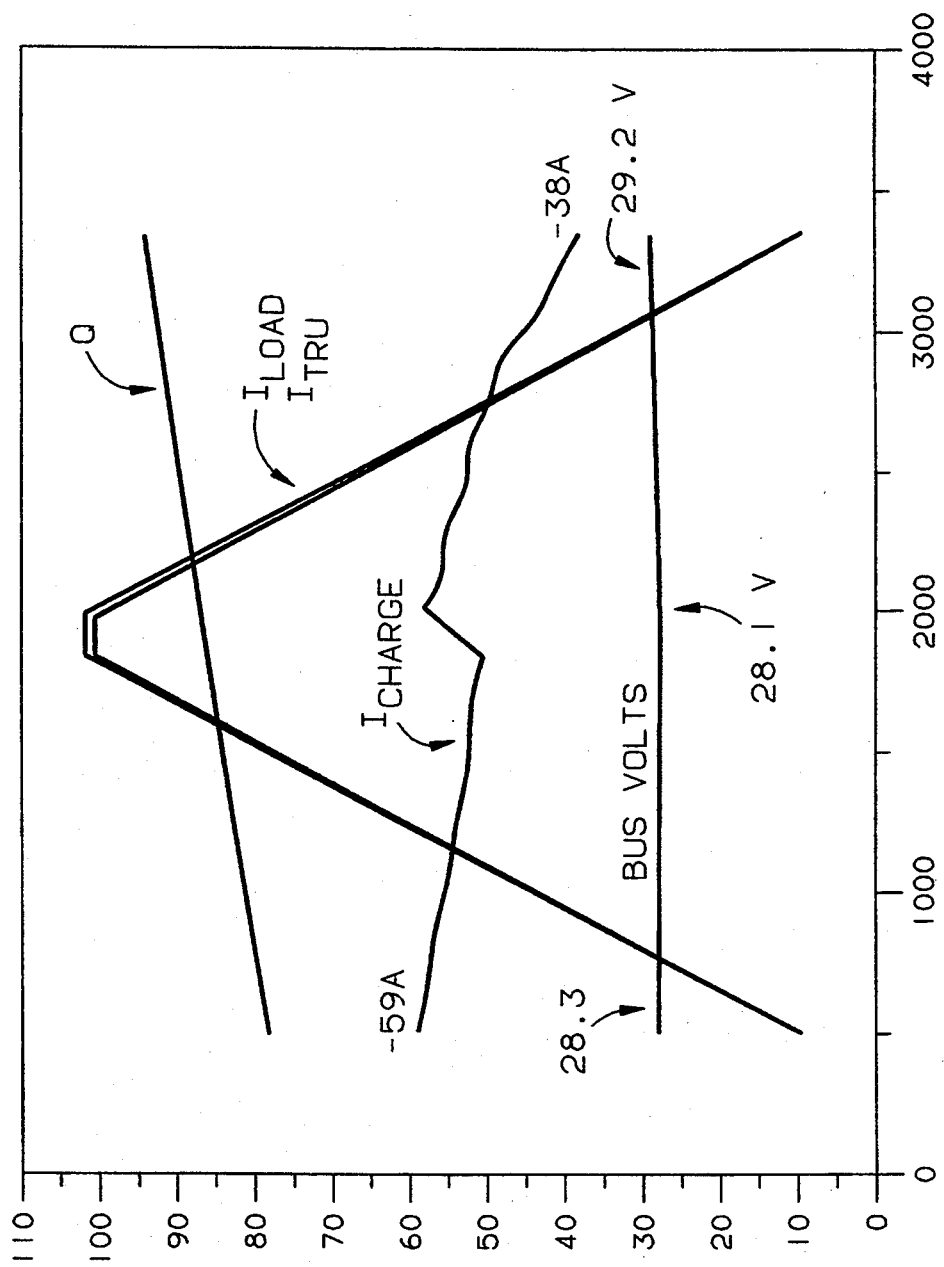
FIG. 9 is a graph illustrating the relationship between DC bus voltage, applied DC bus load, battery charging current, battery charge, and output current of the regulated transformer rectifier in accordance with the instant invention.

Without control of the transformed voltage provided by the primary neutral association and disassociation via rectifier 10, switch 24, and controller 32, the charge characteristics and required charge current would be as shown in FIG. 8. As can be seen from this graph, the charge current varies from approximately 112 amperes to approximately 43 amperes over the charge cycle. The strategy logic incorporated in the controller 32 of the instant invention allows for a much more constant charge current over the charge cycle as shown in FIG. 9. An examination of this graph shows that, by varying the bus voltage by controlling the modulated opening and closing of the switch 24 (see FIG. 6) the charge current varies from approximately 59 amperes to approximately 38 amperes over the same charge cycle as that shown in FIG. 8. This illustrates that the load on the bus can vary from 10 amperes to 100 amperes and back to 10 amperes, with no loss of regulation of the 28 volt dc bus, and very little impact to the battery charge profile over the same period of time.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. The details of the structure may be varied substantially without departing from the spirit of the invention, and the exclusive use of all modifications which come within the scope of the appended claims is reserved.

I claim:

1. An electrical apparatus comprising:
   a bridge circuit having a plurality of rectifier legs electrically coupled in parallel, said parallel connection defining a top node and a bottom node, each of said rectifier legs comprising a first and a second rectifier coupled in series, said series connection of said rectifiers defining an input node therebetween;
   a switch having a control input, and a power input switchably coupled to a power output, said power input being coupled to said top node, and said power output being coupled to said bottom node, said switch coupled in parallel with said rectifier legs of said bridge circuit thereby;
   a controller having a control output coupled to said control input of said switch for regulating the opening and closing of said switch, said switch electrically decoupling and coupling said top note from/to said bottom node thereby; and
   an electrical device having a plurality of windings, said windings having a line and a neutral terminal, configured in a quasi-wye configuration having a disassociated neutral, each of said neutral terminals of said windings being coupled to one of said input nodes of said rectifier legs.

2. An electrical apparatus as recited in claim 1, wherein said controller generates a close command on said control output to close said switch to electrically associate said neutral terminals of said windings, allowing operation of said electrical device thereby.

3. An electrical apparatus as recited in claim 1, wherein said controller generates a trip command on said control output to open said switch to electrically disassociate said neutral terminals of said windings, disallowing operation of said electrical device thereby.

4. An electrical apparatus as recited in claim 1, wherein:
   said line terminals of said electrical device are coupled to an external source of electrical energy; and
   wherein
   said controller generates a pulse-width modulated close command on said control output to control current and provide a soft start of said electrical device by modulating the closing of said switch and, thereby, the electrical association of said neutral terminals of said windings.

5. An electrical apparatus as recited in claim 1, wherein said electrical device is an electrical motor having a rotor and a stator, and wherein said windings are stator windings, said line terminals of said windings being coupled to an external source of electrical energy.

6. An electrical apparatus as recited in claim 5, further comprising:
voltage waveform sensing means coupled to at least one of said windings for monitoring applied voltage from the external source of electrical energy, said waveform sensing means communicating applied voltage waveform information to said controller;
rotor sensing means for monitoring the rotational velocity of said rotor, said rotor sensing means communicating rotational velocity information to said controller; and wherein
said controller monitors said applied voltage waveform information, and said rotational velocity information, calculates a switch closure period, and generates a pulse-width modulated close command in response thereto to control the rotational acceleration of said rotor and thus control current flow into the motor.

7. An electrical apparatus as recited in claim 5, further comprising:
voltage waveform sensing means coupled to at least one of said windings for monitoring applied voltage from the external source of electrical energy, said waveform sensing means communicating applied voltage waveform information to said controller; and wherein
said controller monitors said applied voltage waveform information, calculates a switch closure period of each source voltage cycle, and generates a pulse-width modulated close command in response thereto to position a flux vector in the stator of said motor.

8. An electrical apparatus as recited in claim 7, wherein said controller varies said switch closure period of each source voltage cycle to establish a clockwise advance of said flux vector about said stator, resulting in a clockwise rotation of said rotor thereby.

9. An electrical apparatus as recited in claim 7, wherein said controller varies said switch closure period of each source voltage cycle to establish a counter-clockwise advance of said flux vector about said stator, resulting in a counter-clockwise rotation of said rotor thereby.

10. An electrical apparatus as recited in claim 7, wherein said controller skips successive switch closure periods of each source voltage cycle to slow the rate of re-positioning of said flux vector resulting in a slower rate of rotation of said rotor.

11. An electrical apparatus as recited in claim 7, further comprising:
position sensing means for monitoring the position of an external mechanism drivably coupled to said rotor, said position sensing means communicating mechanism position information to said controller; and wherein
said controller monitors said mechanism position information, calculates a switch closure period of each source voltage cycle, and generates a pulse-width modulated close command in response thereto to successively shift to slower speeds by skipping electrical cycles to obtain servo motor characteristics thereby driving the mechanism to a particular position.

12. An electrical apparatus as recited in claim 1, wherein said electrical device is an electrical generator having said line terminals of said windings coupled to external loads.

13. An electrical apparatus as recited in claim 12, further comprising:
voltage waveform sensing means coupled to at least one of said windings for monitoring AC voltage generated by said electrical generator, said waveform sensing means communicating generated voltage waveform information to said controller; and wherein
said controller monitors said generated voltage waveform information, calculates a switch closure period, and generates a pulse-width modulated close command in response thereto to regulate said voltage.

14. An electrical apparatus as recited in claim 1, wherein said electrical device is a transformer, and wherein said windings are primary windings, said line terminals of said primary windings being coupled to an external source of electrical energy, said transformer further comprising at least one secondary winding.

15. An electrical apparatus as recited in claim 14, further comprising:
voltage sensing means coupled to said at least one secondary winding for monitoring the voltage present thereon, said voltage sensing means communicating voltage information to said controller; and wherein
said controller monitors said voltage information, calculates a switch closure period, and generates a pulse-width modulated close command in response thereto to regulate said voltage.

16. A regulated power supply, comprising:
a bridge circuit having a plurality of rectifier legs electrically coupled in parallel, said parallel connection defining a top node and a bottom node, each of said rectifier legs comprising a first and a second rectifier coupled in series, said series connection of said rectifiers defining an input note therebetween;
a switch having a control input, and a power input switchably coupled to a power output, said power input being coupled to said top node, and said power output being coupled to said bottom node, said switch coupled in parallel with said rectifier legs of said bridge circuit thereby;
a controller having a control output coupled to said control input of said switch for regulating the opening and closing of said switch, said switch electrically decoupling and coupling said top node from/to said bottom node thereby;
a permanent magnet generator having a stator having a plurality of windings, each having a line and a neutral terminal, configured in a quasi-wye configuration having a disassociated neutral, said neutral terminal of each of said plurality of stator windings being coupled to one of said input nodes of said rectifier legs;
voltage sensing means coupled to at least one of said line terminals of said windings for monitoring voltage generated thereon, said voltage sensing means communicating voltage information to said controller; and wherein said controller monitors said voltage information, calculates a switch closure period, and generates a pulse-width modulated close command in response thereto to regulate said generated voltage.

17. A regulated power supply as recited in claim 16, further comprising:

a rectifier having an input coupled to each of said line terminals of said windings, and an output, said rectifier generating a DC output voltage; and a filter having an input coupled to said output of said rectifier, and an output coupled to an external load, said filter being configured to remove ripple from said DC output voltage.

18. A regulated power supply as recited in claim 16, wherein said stator of said permanent magnet generator comprises three windings.

19. A regulated transformer rectifier, comprising:

a bridge circuit having a plurality of rectifier legs electrically coupled in parallel, said parallel connection defining a top node and a bottom node, each of said rectifier legs comprising a first and a second rectifier coupled in series, said series connection of said rectifiers defining an input node therebetween;

a switch having a control input, and a power input switchably coupled to a power output, said power input being coupled to said top node, and said power output being coupled to said bottom node, said switch coupled in parallel with said rectifier legs of said bridge circuit thereby;

a controller having a control output coupled to said control input of said switch for regulating the opening and closing of said switch, said switch electrically decoupling and coupling said top node from/to said bottom node thereby;

a transformer having a plurality of primary windings, each having a line and a neutral terminal, configured in a quasi-wye configuration having a disassociated neutral, and at least one secondary winding having a line and a neutral terminal, each of said neutral terminals of said primary windings being coupled to one of said input nodes of said rectifier legs, said line terminals of said primary windings being coupled to an external source of electrical energy;

an output rectifier having at least one input coupled to said line terminal of said at least one secondary winding, and an output;

voltage sensing means coupled to said line terminal of said at least one secondary winding for monitoring the voltage present thereon, said voltage sensing means communicating voltage information to said controller; and wherein said controller monitors said voltage information, calculates a switch closure period, and generates a pulse-width modulated close command in response thereto to regulate said voltage.

20. A regulated transformer rectifier as recited in claim 19, further comprising a filter having an input coupled to said output of said output rectifier, and an output coupled to an external load, said filter being configured to remove ripple from said voltage.

21. A regulated transformer rectifier as recited in claim 19, further comprising:

a DC current sensor; and wherein said output is additionally coupled to a battery; and wherein said DC current sensor monitors current flow into and out of the battery, said DC current sensor communicating DC current information to said controller; and wherein said controller incorporates strategy logic which monitors said voltage information and said battery current information, calculates a switch closure period, and generates a pulse-width modulated close command in response thereto to gradually change the desired magnitude of said voltage present on said output to enable controlled charge and discharge of the battery.

* * * * *